(12) United States Patent
Kim et al.

(10) Patent No.: US 9,109,092 B2
(45) Date of Patent: Aug. 18, 2015

(54) METHOD FOR PREPARING FURANIC COPOLYAMIDE DERIVED FROM BIOMASS USING SOLID-STATE POLYMERIZATION

(71) Applicant: KOREA INSTITUTE OF SCIENCE AND TECHNOLOGY, Seoul (KR)

(72) Inventors: Jaehoon Kim, Seoul (KR); Jong Min Park, Seoul (KR); Hong Shik Lee, Seoul (KR); Endah Yohana Kurnia, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 13/893,637

(22) Filed: May 14, 2013

(65) Prior Publication Data

US 2014/0228523 A1    Aug. 14, 2014

(30) Foreign Application Priority Data

Feb. 12, 2013    (KR) .................. 10-2013-0014959

(51) Int. Cl.
*C08G 81/00*    (2006.01)
*C08G 69/46*    (2006.01)

(52) U.S. Cl.
CPC ................ *C08G 81/00* (2013.01); *C08G 69/46* (2013.01); *C08L 2205/02* (2013.01)

(58) Field of Classification Search
CPC ........ C08G 69/00; C08G 69/02; C08G 69/04; C08G 69/06; C08G 69/28; C08G 69/30; C08G 69/42; C08G 69/46; C08G 69/48; C08L 2205/02; C08L 2205/025
See application file for complete search history.

(56) References Cited

U.S. PATENT DOCUMENTS 6,069,228 A * 5/2000 Alsop et al. .................. 528/310

\* cited by examiner

*Primary Examiner* — Ana Woodward
(74) *Attorney, Agent, or Firm* — Ladas & Parry LLP

(57) ABSTRACT

Disclosed is a method for preparing a semi-furanic copolyamide containing at least one furanic dicarboxylic acid moiety and at least one aliphatic diamine moiety in the backbone. The method is based on solid-state polymerization. Particularly, the method uses a biomass-derived furanic dicarboxylic acid as a raw material. A semi-furanic copolyamide prepared by the method has molecular weight and color levels that are practically required in industrial applications. In addition, the semi-furanic copolyamide can replace fossil fuels due to its good thermal stability and is suitable for use as an environmentally friendly bioplastic.

7 Claims, 3 Drawing Sheets

METHOD FOR PREPARING FURANIC COPOLYAMIDE DERIVED FROM BIOMASS USING SOLID-STATE POLYMERIZATION

CROSS-REFERENCE TO RELATED APPLICATIONS

This application claims priority under 35 U.S.C. §119 to Korean Patent Application No. 10-2013-0014959 filed on Feb. 12, 2013, in the Korean Intellectual Property Office, the disclosure of which is incorporated herein by reference in its entirety.

BACKGROUND OF THE INVENTION

1. Field of the Invention

The present invention relates to a method for preparing a semi-furanic copolyamide containing at least one furanic dicarboxylic acid moiety and at least one aliphatic diamine moiety in the backbone using solid-state polymerization. More particularly, the present invention relates to a method for preparing a semi-furanic copolyamide that uses a biomass-derived furanic dicarboxylic acid as a raw material.

2. Description of the Related Art

With the recent violently fluctuating oil prices and increasing concern about environmental pollution, there has been a growing interest in the development of natural polymers found in nature and bioplastics as synthetic polymers synthesized from biomass-derived monomers due to their potential replacements for existing fossil fuels.

The world's annual biomass production is estimated to be 10 times the world's total annual energy consumption. The idea to effectively use biomass as a renewable energy source is on the rise. Thus, strategies to use biomass have recently been issued in the field of biotechnology. Biodegradable plastics have been suggested as examples of the strategies. Particularly, bioplastics are recyclable materials that are produced using biomass resources as raw materials by biological or chemical processes, but they have the problem of high production costs and are required to have high performance.

Much research has been conducted for many years on natural polymers, such as natural rubbers and celluloses. Such natural polymers have already been used in large amounts. The history of research on synthetic polymers derived from biomass is not relatively long. Only a few of the synthetic polymers are commercially successful and are applied to practical use.

The most well-known synthetic polymers are polylactides, which are currently produced on an industrial scale. Research is underway to improve the physical properties of polylactides in countries around the world. In addition to this research, studies are underway to synthesize polyolefins using monomers converted from bioethanol and to synthesize triglycerides as major ingredients of animal and vegetable oils and fats. Most monomers for polyamides, such as adipic acid and caprolactam, are currently produced by petrochemical processes. Proposals have been made recently on methods for producing the monomers from biomass. However, studies on the synthesis of polyamides based on the proposed methods still remain at the early stages because the methods are disadvantageous in terms of economic efficiency compared to petrochemical processes. Examples of polyamides synthesized using biomass-derived monomers include polyamide 11 produced from castor oil and polyamide 4 produced from glucose.

Melt polymerization, solution polymerization, and solid-state polymerization are known as processes for producing the polyamides.

Melt polymerization is advantageous in that a polymer can be produced in a single step. However, when it is intended to produce a polymer having a high melting point by melt polymerization, the polymer is likely to undergo thermal decomposition, gelation, and other troubles, resulting in deterioration of quality. As the polymerization proceeds, the polymer becomes viscous, which makes stirring and temperature control difficult. Further, by-products are not easy to remove. As a result, it is difficult to obtain a high molecular weight of the polymer. For solution polymerization, only a limited number of solvents, such as concentrated sulfuric acid, can be used to dissolve polyamides. That is, the choice of solvents is restrictive in solution polymerization.

Solid-state polymerization for the production of a polymer is performed at a temperature between the glass transition temperature and melting point of the polymer. This reaction temperature can reduce the possibility of heat-induced side reactions. Solid-state polymerization is performed in the absence of solvents. Accordingly, solid-state polymerization is free from disadvantages associated with the use of solvents, unlike solution polymerization. Solid-state polymerization for the production of a polymer is generally performed by the following procedure. First, a prepolymer having a low molecular weight is produced by melt polymerization. The prepolymer is pulverized into a powder, and then the prepolymer powder is introduced into a suitable reactor, such as a packed bed reactor, a fluidized bed reactor, a fixed bed reactor or a moving bed reactor. The prepolymer is polymerized in a solid state at a temperature between the glass transition temperature and melting point of the polymer while feeding a continuous flow of a sweep fluid for removal of by-products into the reactor. The polymerization increases the molecular weight of the prepolymer.

The presence of an aromatic monomer in a polyamide increases the crystallinity of the polyamide and ensures superior heat resistance, stiffness and dimensional stability of the polyamide. Due to these advantages, polyamides can be used as engineering plastics in a wide range of applications where high strength and good heat resistance are required, particularly, electronic/electrical materials, such as surface mounting devices (SMTs), LED reflectors and I/O connectors, lightweight interior/exterior materials for automotive vehicles capable of substituting for metals to reduce the weight of automotive vehicles and protect automotive vehicles from corrosion, industrial materials, and aeronautical materials, which are usually produced by injection molding. Examples of such semi-aromatic polyamides include polyamide 4,T produced from terephthalic acid and 1,4-butanediamine, and polyamide 6,T produced from terephthalic acid and hexamethylenediamine.

Polyamide 4,T and polyamide 6,T have high crystallinity and superior heat resistance but are not suitable for injection molding due to their higher melting temperatures, 430° C. and 370° C., respectively, than those of conventional polyamides. Accordingly, it is difficult to use the polyamides in the above-described applications. Thus, attempts have been made to produce highly heat resistant copolyamides suitable for injection molding by adjusting the melting points of polyamide 4,T and polyamide 6,T within the range of 300 to 330° C. As the copolyamides, copolyamide 4,T/4,6, copolyamide 6,T/4,6, and copolyamide 4,T/6,T/4,6 have been proposed. Copolyamide 4,T/4,6 is obtained by copolymerization of polyamide 4,6 produced from adipic acid and 1,4-butanediamine and polyamide 4,T. Copolyamide 6,T/4,6 is obtained by copolymerization of polyamide 4,6 and polyamide 6,T. Copolyamide 4,T/6,T/4,6 is obtained by copolymerization of polyamide 4,6, copolyamide 4,T and polyamide 6,T.

Efforts have been made to produce semi-furanic copolyamides as substitutes for semi-aromatic copolyamides by introducing FDCA instead of terephthalic acid. However, the colors of the semi-furanic copolyamides tend to change or the molecular weights of the semi-furanic copolyamides are not sufficiently high. Due to these problems, none of the semi-furanic copolyamides reported hitherto are successful. Under such circumstances, there is a need for a novel semi-furanic copolyamide and a preparation method thereof.

SUMMARY OF THE INVENTION

The present invention has been made in view of the problems of conventional copolyamides derived from biomass, and it is an object of the present invention to provide a novel semi-furanic copolyamide represented by Formula 1:

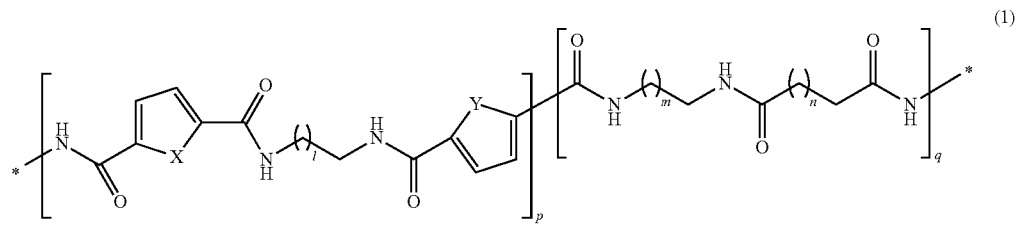

wherein X, Y, l, m, n, p and q are as defined below.

It is another object of the present invention to provide a method for preparing the semi-furanic copolyamide of Formula 1.

According to an aspect of the present invention, there is provided a semi-furanic copolyamide represented by Formula 1:

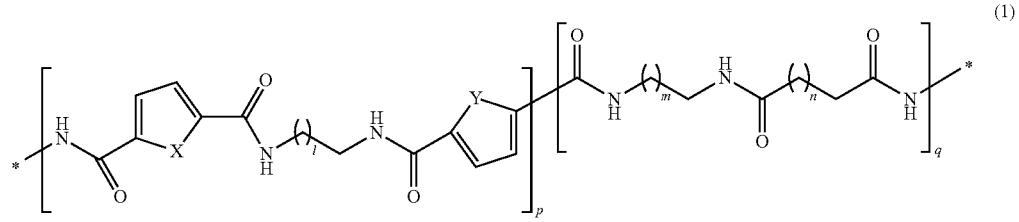

wherein X, Y, l, m, n, p and q are as defined below.

According to another aspect of the present invention, there is provided a method for preparing the semi-furanic copolyamide of Formula 1, the method including:

(a) preparing a copolyamide prepolymer containing furanic dicarboxylic acid, aliphatic dicarboxylic acid and aliphatic diamine moieties; and (b) increasing the molecular weight of the prepolymer prepared in (a) to obtain a furanic copolyamide.

The method of the present invention enables the preparation of a semi-furanic copolyamide from a biomass-derived furanic dicarboxylic acid. The semi-furanic copolyamide has molecular weight and color levels that are practically required in industrial applications. In addition, the semi-furanic copolyamide can replace fossil fuels due to its good thermal stability and is suitable for use as an environmentally friendly bioplastic.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
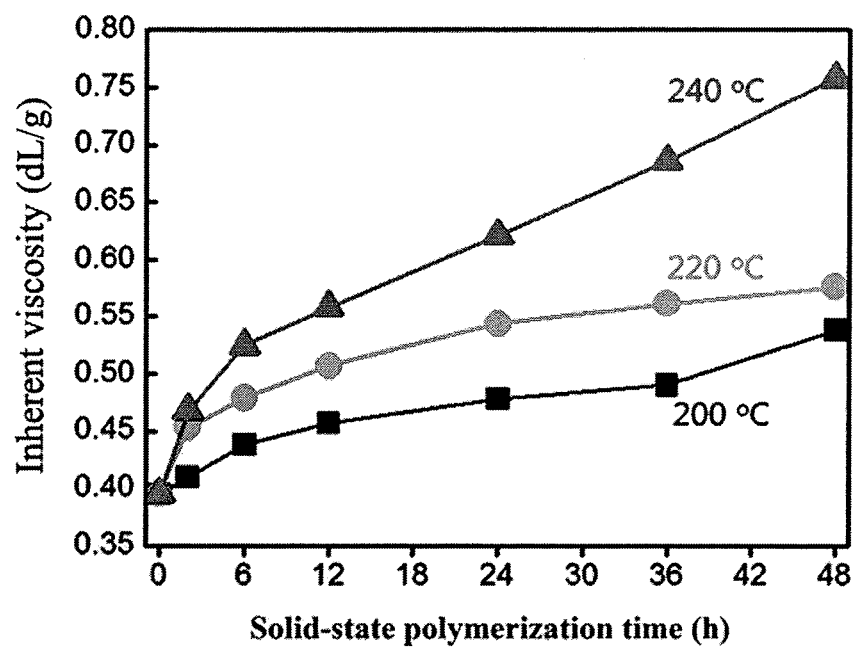
FIG. 1 is a graph showing changes in the intrinsic viscosity of copolyamides prepared at different solid-state polymerization temperatures in Examples 1 to 3 as a function of reaction time.

The present invention will now be described in detail.

The present invention provides a compound represented by Formula 1:

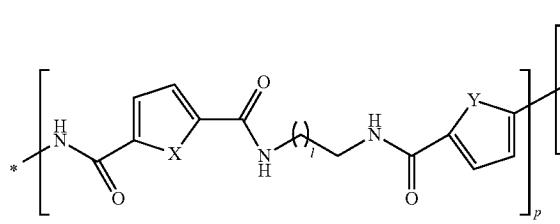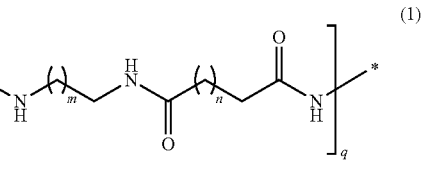 (1)

wherein X and Y are each independently selected from the group consisting of oxygen (O), sulfur (S) and nitrogen (N) atoms, l, m and n are each independently an integer from 1 to 30, and p and q are each independently an integer from 1 to 10,000.

Preferably, in Formula 1, X and Y are each independently selected from the group consisting of oxygen (O), sulfur (S) and nitrogen (N) atoms, l, m and n are each independently an integer from 3 to 11, and p and q are each independently an integer from 50 to 1,000.

The present invention also provides a method for preparing the semi-furanic copolyamide, including:

(a) adding two different polyamide salts to a stirred reactor, and reacting the polyamide salts in a nitrogen atmosphere to prepare a copolyamide prepolymer containing at least one furanic dicarboxylic acid moiety, at least one aliphatic dicarboxylic acid moiety and at least one aliphatic diamine moiety in the copolyamide backbone; and (b) pulverizing the copolyamide prepolymer prepared in (a), and reacting the copolyamide prepolymer in a solid-state polymerization reactor while feeding a mixed fluid of an inert gas and water into the reactor, to increase the molecular weight of the copolyamide prepolymer.

In step (a), two different polyamide salts are introduced into a stirred reactor where high temperature and high pressure conditions can be maintained, and are allowed to react with increasing reaction temperature and pressure for a predetermined time in the presence of a predetermined amount of water to prepare a prepolymer.

The copolyamide prepolymer prepared in step (a) may contain a moiety of at least one furanic dicarboxylic acid selected from the group consisting of 1,4-furandicarboxylic acid and its dialkyl ester derivatives, a moiety of at least one aliphatic dicarboxylic acid selected from the group consisting of $C_4$-$C_{12}$ straight-chain dicarboxylic acids and $C_4$-$C_{12}$ cyclic dicarboxylic acids, and a moiety of at least one aliphatic diamine selected from the group consisting of $C_4$-$C_{12}$ straight-chain diamines.

The polyamide salts used to prepare the copolyamide prepolymer in step (a) are selected from the group consisting of polyamide 4,F, polyamide 4,6, polyamide 4,T and polyamide 6,T salts. As the polyamide salts, polyamide 4,F and polyamide 4,6 salts are preferably used.

The polyamide salts used to prepare the copolyamide prepolymer in step (a) may be prepared separately. Alternatively, the polyamide salts may be prepared by mixing all constituent monomers at one time.

In step (a), the reaction may be carried out at a temperature of 120 to 260° C. The reaction temperature is preferably from 160 to 220° C.

If the reaction temperature is outside the range defined above, particularly, below 120° C., it is difficult to expect effective chain extension reactions of the polyamide salts, making it impossible to obtain a high molecular weight of the prepolymer. Meanwhile, if the reaction temperature exceeds 260° C., the polyamide salts undergo side reactions, such as cyclization and coloration, making it impossible to achieve high quality of the prepolymer.

In step (a), the reaction is carried out in the presence of water in an amount of 5 to 50% by weight with respect to the weight of the polyamide salts. The water is preferably present in an amount of 10 to 35% by weight, based on the weight of the polyamide salts.

If the water content is outside the range defined above, particularly, less than 5% by weight, the prepolymer precipitates rapidly, making it difficult to obtain a high molecular weight of the prepolymer. Meanwhile, if the water content exceeds 50% by weight, large amounts of by-products are produced. The by-products prevent the forward reaction from proceeding, making it difficult to obtain a high molecular weight of the prepolymer.

The inert gas used in step (b) is not particularly limited. Any gas that does not participate in the chain extension reactions of the prepolymer may be used as the inert gas, and examples thereof include nitrogen, helium, argon and carbon dioxide.

In step (b), the molar ratio of the inert gas to water in the mixed fluid is 0.1-50:1. The inert gas and water are preferably mixed in a molar ratio of 1-30:1.

If the molar ratio is outside the range defined above, particularly, the moles of the inert gas are 50 times larger than those of water, the polyamide prepolymer undergoes side reactions, such as cyclization and coloration, making it impossible to achieve high quality of the semi-furanic copolyamide. Meanwhile, if the moles of the inert gas are 0.1 times smaller than those of water, large amounts of by-products are produced. The by-products hinder effective chain extension reactions of the prepolymer, making it difficult to obtain a high molecular weight of the semi-furanic copolyamide.

In step (b), the reaction may be carried out at a temperature of 150 to 300° C. The reaction temperature is preferably from 200 to 280° C.

When solid-state polymerization is performed using the mixed fluid of inert gas and water in step (b) to increase the molecular weight of the prepolymer, the reaction temperature is considered a very important factor. Particularly, if the reaction temperature is lower than 150° C., it is difficult to expect effective chain extension reactions of the prepolymer, making it impossible to obtain a high molecular weight of the semi-furanic copolyamide. At a low reaction temperature, a long reaction time is disadvantageously required to obtain a high molecular weight of the copolyamide. If the reaction temperature is higher than 300° C., the prepolymer undergoes side reactions, such as cyclization and coloration, other than chain extension reactions, and is melted due to its low molecular weight, making it difficult to achieve high quaintly of the semi-furanic copolyamide.

The present invention also provides a bioplastic including the semi-furanic copolyamide.

The semi-furanic copolyamide of the present invention has a intrinsic viscosity of 0.5 dL/g and can replace fossil fuels due to its very good thermal stability. In addition, the semi-furanic copolyamide of the present invention is suitable for use as an environmentally friendly bioplastic.

The present invention will be explained in detail with reference to the following examples, including preparative examples and an experimental example.

However, these examples are provided for illustrative purposes only and are not intended to limit the invention.

EXAMPLES

Preparative Example 1

Preparation of Polyamide 4,F Salt 176.3 g of 1,4-butanediamine was dissolved in 1.6 L of distilled water, and then 312.2 g of 1,4-furandicarboxylic acid (FDCA) was slowly added thereto with stirring. The reaction was allowed to proceed to obtain a polyamide 4,F solution. The polyamide 4,F solution was cooled to room temperature. 3.5 L of ethanol was added to the polyamide 4,F solution with stirring to precipitate polyamide 4,F salt.

The precipitated polyamide 4,F salt was filtered through a filter paper, washed with cold ethanol, and dried in a vacuum oven at 60° C. for 48 hr.

Preparative Example 2

Preparation of Polyamide 4,6 Salt 176.3 g of 1,4-butanediamine was dissolved in 1,400 g of methanol, and then 292.2 g of adipic acid was slowly added thereto with stirring at 60° C. The reaction was allowed to proceed to obtain a polyamide 4,6 solution. The solution was cooled to room temperature to precipitate polyamide 4,6 salt. The precipitate was filtered, washed with cold methanol, and dried in a vacuum oven at 60° C. for 48 hr.

Example 1

Preparation of Semi-Furanic Copolyamide-1

Step 1: Preparation of Semi-Furanic Copolyamide Prepolymer

In this step, copolyamide 4,F/4,6 including polyamide 4,F and polyamide 4,6 in a molar ratio of 1:9 was prepared. First, 33 g of polyamide 4,F prepared in Preparative Example 1, 277 g of the polyamide 4,6 salt prepared in Preparative Example 2, and 31 g of water were fed into a 1.2 L stirred autoclave made of stainless steel (Grade 316) and stirred in a nitrogen atmosphere with increasing reaction temperature from 25° C. to 170° C. over 1 hr. Subsequently, the reaction temperature was increased from 170° C. to 220° C. over 4 hr and from 220° C. to 270° C. over 3 hr to prepare a prepolymer.

Step 2: Preparation of Semi-Furanic Copolyamide

The prepolymer prepared in step 1 was pulverized into a powder having a size of 250-500 μm. The prepolymer powder was fed into a tubular solid-state polymerization reactor made of stainless steel (Grade 316). Thereafter, the reaction was carried out in a solid state at a temperature of 200° C. for 24 hr while allowing nitrogen and water in a molar ratio 2:1 to flow at a rate of 3 L/min into the solid-state polymerization reactor, followed by cooling to obtain the title copolyamide.

Example 2

Preparation of Semi-Furanic Copolyamide-2

The title copolyamide was obtained in the same manner as in Example 1, except that the internal reaction temperature of the solid-state polymerization reactor in step 2 was raised to 220° C. instead of 200° C.

Example 3

Preparation of Semi-Furanic Copolyamide-3

The title copolyamide was obtained in the same manner as in Example 1, except that the internal reaction temperature of the solid-state polymerization reactor in step 2 was raised to 240° C. instead of 200° C.

Experimental Example 1

Analysis of the Semi-Furanic Copolyamides

The following experiments were conducted to analyze the characteristics of the semi-furanic copolyamides prepared in Examples 1-3.

(1) Measurement of Intrinsic Viscosities

Samples of the copolyamides prepared after solid-state polymerization in Examples 1-3 were dried in a vacuum oven whose temperature was maintained at 80° C. for 24 hr. The intrinsic viscosities of the copolyamides were measured to evaluate how much the molecular weights of the copolyamides were increased after solid-state polymerization.

The intrinsic viscosities of the copolyamides were measured using a viscosity measuring system (AVS370, Schott Instrument) employing an Ubbelohde viscometer under the conditions specified in ISO 307.

Results

As shown in FIG. 1, the intrinsic viscosities of the copolyamides 4,F/4,6, which were prepared from the prepolymer having an intrinsic viscosity of 0.395 dL/g by solid-state polymerization at 200, 220 and 240° C. for 48 hr in Examples 1-3, were 0.538, 0.576 and 0.758 dL/g, respectively, indicating that the intrinsic viscosities of the copolyamides are 36.2%, 45.8% and 91.9% higher than the intrinsic viscosity of the prepolymer, respectively.

These results confirm that solid-state polymerization significantly increases the molecular weights of the copolyamides 4,F/4,6.

(2) Measurement of Degrees of Crystallinity of the Copolyamides

The Tm values and degrees of crystallinity of the copolyamides after drying were measured using a differential scanning calorimeter (DSC, Texas Instrument).

Results

Figure 2:
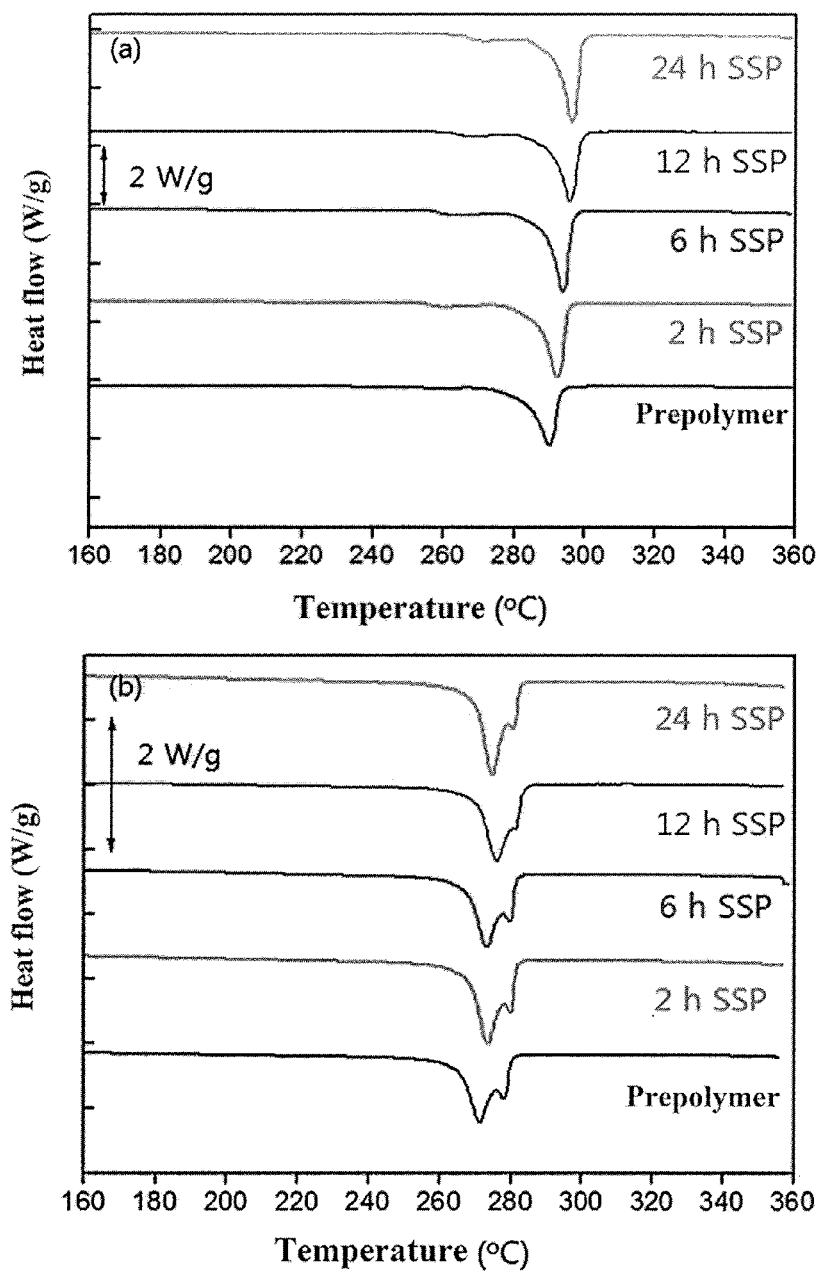
FIG. 2 graphically shows the Tm values and degrees of crystallinity of a copolyamide prepared in Example 2, as measured by differential scanning calorimetry.

The melting point and heat of fusion of the copolyamide prepared in Example 2 were investigated using a differential scanning calorimeter (DSC). As shown in FIG. 2, the melting point and heat of fusion of the copolyamide after solid-state polymerization at 240° C. for 24 hr were 296° C. and 101 J/g at the first scan, respectively, and were 275° C. and 74 J/g at the second scan, respectively. These results confirm that the copolyamide is semi-crystalline.

(3) Measurement of Thermal Stability 5 mg of each of the copolyamide samples prepared in Examples 1-3 was introduced into a pan, heated at a rate of 10° C./min from 30° C. to 360° C. under a nitrogen atmosphere of 50 ml/min (first heating), cooled at a rate of 10° C./min to 30° C., and heated at a rate of 10° C./min to 360° C. (second heating). The melting point and heat of fusion of the copolyamide were determined based on the data measured under the second heating conditions. The temperatures at which weight loss reached 5% and 10% were measured using a thermogravimetric analyzer (TGA, Texas Instrument). After 5 mg of each of the copolyamide samples was introduced into a pan, the measurements were done with increasing temperature at a rate of 10° C./min from 30° C. to 700° C. under a nitrogen atmosphere of 50 ml/min.

Results

Figure 3:
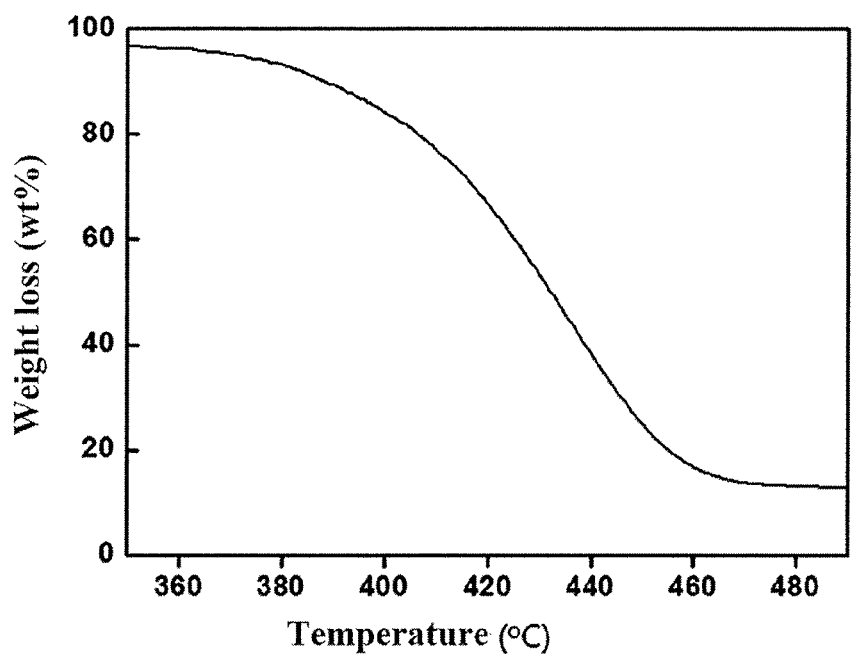
FIG. 3 is a graph showing the thermal stability of a copolyamide prepared in Example 2, as measured by thermogravimetric analysis.

The thermal stability of the copolyamide prepared by polymerization at 220° C. for 6 hr in Example 2 was evaluated using TGA. The results are shown in FIG. 3. As shown in FIG. 3, the copolyamide lost 5% of its weight at 371° C. and 10% of its weight at 389° C., demonstrating good thermal stability of the copolyamide 4,F/4,6.

These results lead to the conclusion that the semi-furanic copolyamide can replace fossil fuels due to its good thermal stability and is suitable for use as an environmentally friendly bioplastic.

What is claimed is:

1. A method for preparing a copolyamide compound comprising:
    (a) adding a first polyamide salt and a second polyamide salt to a stirred autoclave, and reacting the polyamide salts in a nitrogen atmosphere to prepare a copolyamide prepolymer comprising at least one furanic, azolic or thiophenic dicarboxylic acid moiety, at least one aliphatic dicarboxylic acid moiety and at least one aliphatic diamine moiety in the copolyamide backbone; and
    (b) pulverizing the copolyamide prepolymer prepared in (a), and reacting the copolyamide prepolymer in a solid-state polymerization reactor while feeding a mixed fluid of an inert gas and water into the reactor, to increase the molecular weight of the copolyamide prepolymer;

wherein said copolyamide compound is represented by Formula 1:

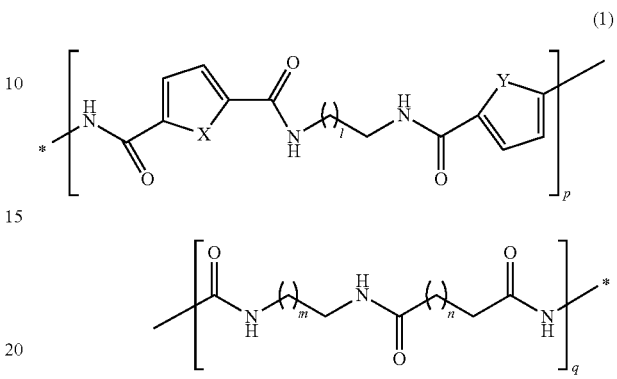

wherein X and Y are each independently selected from the group consisting of oxygen (O), sulfur (S) and nitrogen (N) atoms, l, m and n are each independently an integer from 1 to 30, and p and q are each independently an integer from 1 to 10,000.

2. The method according to claim 1, wherein, in step (a), the reaction is carried out at a temperature of 120 to 260° C.

3. The method according to claim 1, wherein, in step (a), the reaction is carried out in the presence of water in an amount of 5 to 50% by weight with respect to the weight of the polyamide salts.

4. The method according to claim 1, wherein the inert gas used in step (b) is selected from the group consisting of nitrogen, helium, argon and carbon dioxide.

5. The method according to claim 1, wherein the molar ratio of the inert gas to water in the mixed fluid used in step (b) is 0.1-50:1.

6. The method according to claim 1, wherein, in step (b), the reaction is carried out at a temperature of 150 to 300° C.

7. A method for preparing a copolyamide compound comprising:
    (a) adding a first polyamide salt and a second polyamide salt to a stirred autoclave, and reacting the polyamide salts in the presence of water in an amount of 10 to 35% by weight with respect to the weight of the polyamide salts in a nitrogen atmosphere to prepare a copolyamide prepolymer comprising at least one furanic, azolic or thiophenic dicarboxylic acid moiety, at least one aliphatic dicarboxylic acid moiety and at least one aliphatic diamine moiety in the copolyamide backbone; and
    (b) pulverizing the copolyamide prepolymer prepared in (a), and reacting the copolyamide prepolymer in a solid-state polymerization reactor while feeding a mixed fluid of an inert gas and water into the reactor, to increase the molecular weight of the copolyamide prepolymer;

wherein said copolyamide compound is represented by Formula 1:

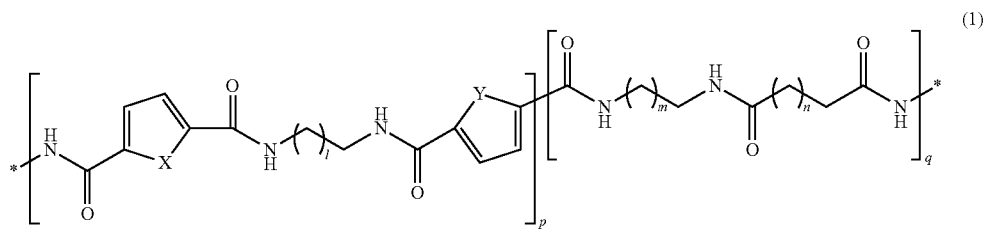
wherein X and Y are each independently selected from the group consisting of oxygen (O), sulfur (S) and nitrogen (N) atoms,
l, m and n are each independently an integer from 1 to 30, and
p and q are each independently an integer from 1 to 10,000;
and said first polyamide salt and said second polyamide salt are not the same salt.
* * * * *